United States Patent [19]
Arkhipkin et al.

[11] Patent Number: 5,995,536
[45] Date of Patent: Nov. 30, 1999

[54] SYSTEM FOR DISCRETE DATA TRANSMISSION WITH NOISE-LIKE, BROADBAND SIGNALS

[75] Inventors: Vladimir J. Arkhipkin; Konstantin A. Meshkovsky, both of Moscow, Russian Federation; Franklin S. Miller, Summit, N.J.; Alexander G. Sokolov, Moscow, Russian Federation

[73] Assignee: BSD Broadband, N.V., Russian Federation

[21] Appl. No.: 09/012,350

[22] Filed: Jan. 23, 1998

[51] Int. Cl.$^6$ .................................................... H04B 1/69
[52] U.S. Cl. ................................................................ 375/200
[58] Field of Search .................................. 375/200, 208, 375/367, 206

[56] References Cited

U.S. PATENT DOCUMENTS

Re. 35,209   4/1996   Partyka et al. .
4,291,409   9/1981   Weinberg et al. .

(List continued on next page.)

FOREIGN PATENT DOCUMENTS 6197091   7/1994   Japan .

OTHER PUBLICATIONS

Higuchi et al., "Fast Cell Search Algorithm in DS–CDMA Mobile Radio Using Long Spreading Codes," May 4, 1997, 1997 IEEE 47$^{th}$ Vehicle Technology Conference, vol. 3, pp. 1430–1434.
Robert C. Dixon, *Spread Spectrum Systems with Commercial Applications* (3d ed. 1994), pp. 60–70, 91–93.
George C. Clark, Jr., and J. Bib Cain, *Error–Correction Coding for Digital Communications* (1981), pp. 2–17, 332–33, 345–49, 366–75.
Jack K. Holmes, *Coherent Spread Spectrum Systems* (1982), pp. 1–3, 304–309, 344–49, 395–97, 467–71, 564–67.

Jerry D. Gibson, *Digital and Analog Communications* (2nd ed. 1993), pp. 405–36.

James J. Spilker, *Digital Communications by Satellite*, (1977), pp. 528–608.

Primary Examiner—Temesghen Ghebretinsae
Attorney, Agent, or Firm—Baker & Botts, L.L.P.

[57] ABSTRACT

An improved system for transmitting and receiving spread spectrum signals includes a transmitter and a receiver, each with a data channel and a control channel. The transmitter uses two pseudorandom noise sequences (PNS), one whose period is equal to that of a coded data bit ("bit PNS"), the other whose period is equal to that of a codeword ("word PNS"). The data channel is modulated by a carrier signal and spread by the bit PNS. The control channel is modulated by a quadrature-phase version of the carrier signal and spread by the word PNS. The control channel sends instructions to the PNS generators to change the forms of the PN sequences in the transmitter. The receiver includes a control channel tracking and acquisition (T&A) and carrier restoration module and a data channel T&A module. The control channel T&A uses a stored version of the word PNS and outputs a word synchronization signal, a phased version of the word PNS, a quadrature-phase carrier signal, and an in-phase carrier signal. The receiver control channel recovers the control signals and uses them to change the forms of the PN sequences in the receiver. The data channel T&A uses a stored version of the bit PNS to despread the received signal. The data channel T&A also outputs a bit synchronization signal used in decision-making and decoding the demodulated received signal. By using the two PNS generators, this system eliminates the need for separate clock frequency extraction hardware and frame or word synchronization hardware, improving receiver throughput, simplifying the receiver, and making it less expensive. By changing the PNS forms, the system operates with a wider effective bandwidth resulting in increased processing gain, noise immunity, interference rejection, and channel capacity.

16 Claims, 6 Drawing Sheets

U.S. PATENT DOCUMENTS

| | | |
|---|---|---|
| 4,392,220 | 7/1983 | Hirosaki et al. . |
| 4,435,822 | 3/1984 | Spencer et al. .......................... 375/206 |
| 4,630,283 | 12/1986 | Schiff . |
| 4,641,322 | 2/1987 | Hasegawa . |
| 4,962,507 | 10/1990 | Renshaw . |
| 5,008,899 | 4/1991 | Yamamoto . |
| 5,177,765 | 1/1993 | Holland et al. .......................... 375/368 |
| 5,243,622 | 9/1993 | Lux et al. . |
| 5,280,499 | 1/1994 | Suzuki . |
| 5,463,657 | 10/1995 | Rice . |
| 5,495,498 | 2/1996 | Tominaga . |
| 5,515,396 | 5/1996 | Dalekotzin . |
| 5,528,624 | 6/1996 | Kaku et al. . |
| 5,559,788 | 9/1996 | Zscheile, Jr. et al. . |
| 5,576,659 | 11/1996 | Kenington et al. . |
| 5,631,922 | 5/1997 | Sekine et al. . |
| 5,640,416 | 6/1997 | Chalmers . |

SYSTEM FOR DISCRETE DATA TRANSMISSION WITH NOISE-LIKE, BROADBAND SIGNALS

BACKGROUND OF INVENTION

1. Field of the Invention

The present invention relates to broadband communication systems and particularly to systems for transmission and reception of pseudorandom noise and spread spectrum signals, and to code division multiple access systems with application to satellite and terrestrial communications.

2. Description of the Related Art

Spread spectrum systems have been used for many years in digital communications. A spread spectrum signal consists of a baseband message signal modulated onto a carrier and thereafter spread in frequency by a pseudorandom noise sequence ("PN sequence" or "PNS"), independent of the message signal itself. The receiver then recovers the message signal by using a replica of the PN sequence. The main advantages of spread spectrum systems are good interference and noise rejection, low power density, ability to access multiple channels (such as in code division multiple access (CDMA) systems), high resolution ranging, and message protection. The ratio of the bandwidth of the PNS to that of the message signal, called the processing gain, determines the merit of the system.

Typical block diagrams of a spread spectrum transmitter and receiver are found in J. K. Holmes, *Coherent Spread Spectrum Systems* (Wiley 1982), and reproduced as FIGS. 1a and 1b. In the transmitter in FIG. 1a, a digital message signal transmitted at bit rate B is provided to coder 100. This coder encodes the data bits into codewords for transmission and can be a block coder or a convolutional coder as described in G. C. Clark and J. B. Cain, *Error-Correction Coding for Digital Communications* (Plenum Press 1981). Carrier frequency generator 112 generates a carrier frequency signal that is modulated by the coded signal in carrier modulator 106. PNS modulator 108 then further modulates (or spreads) the modulated carrier signal with a PN sequence from PNS generator 128. The PNS is a digital signal made up of "chips" and whose chip interval or chip period is much smaller than the data bit period (thus the bandwidth of the PN sequence is much greater than that of the data signal). The resulting signal is amplified by amplifier 130 and transmitted by antenna 140.

As depicted in FIG. 1b, the transmitted signal is received by antenna 152 and amplified by amplifier 154. Because the phase and frequency of the received signal is unknown, the received signal must be acquired and tracked to establish phase synchronization. The received signal is provided to tracking and acquisition (T&A) synchronism device 164 which contains a PNS generator that generates a replica of the PNS that was used in the transmitter. In the acquisition stage, a coarse alignment between the replicated PNS and the received signal is performed using serial and/or sequential search, sequential estimation, universal timing, or matched filter algorithms. These techniques are described in various references, one of which is R. C. Dixon, *Spread Spectrum Systems with Commercial Applications* (Wiley 1994). The acquisition stage brings the replicated PNS and the received signal within half a chip interval of each other. Once the received signal is acquired, the two signals are tracked, generally using a delay-lock loop. See, e.g., J. J. Spilker, *Digital Communications by Satellite* (Prentice Hall 1977). Once synchronized, T&A synchronism device 164 outputs the in-phase PNS to PNS demodulator 156 which demodulates (despreads) the received signal. The despread signal is provided to carrier restoration and phasing module 166 which provides a local oscillator signal which is phase-synchronized to the carrier signal. The local oscillator signal is used to demodulate the despread signal in coherent detector 158 producing a baseband coded data signal. The baseband signal is provided to clock frequency extractor 168 to extract the clock signal, which in turn is provided to decision circuit 160 which can be implemented as an integrator over a bit period to determine whether a code bit is a one or a zero. Decision circuit 160 provides squared-up digital data code bits to frame synchronization device 170 and noise-immune decoder 162. Frame synchronization device 170 uses the clock signal from clock frequency extractor 168 to extract the word (or frame) timing from the digital data code bits to derive a frame synchronization signal that is used to decode the digital data signal in noise-immune decoder 162 to recover the original digital message signal.

The main problem associated with this spread spectrum system is that the receiver contains a sequence of modules—tracking and acquisition 164, carrier restoration 166, clock extraction 168, and frame synchronization 170—each of which must wait for the previous module to acquire synchronization before being able to start its own synchronization process. The throughput of the system is therefore dependent upon each of the modules and can suffer if only one is slow to synchronize. Another problem is that the receiver requires four separate modules that duplicate some functions, i.e. phasing is performed in T&A synchronism device 164 and in carrier restoration and phasing module 166, and clock frequency extractor 168 is needed because the phasing performed by T&A synchronism device 164 is not accurate enough to clock decision circuit 160.

An improved prior art system is depicted in FIGS. 2a and 2b. In the transmitter in FIG. 2a, coder 204, carrier modulator 206, PNS modulator 208, carrier frequency generator 212, amplifier 230, and antenna 240 perform as in FIG. 1a. New to this transmitter is a second output from PNS generator 228 that provides a pulse corresponding to the beginning of each period of the PNS to switch 222 and period multiplier 210. Switch 222 then provides a clock to buffer memory 202 to synchronously clock the data bits into coder 204. The multiplication factor in period multiplier 210 is variable; thus, the period of the data bits clocked through to coder 204 can vary but is always an integral multiple of the PNS period. The use of this relationship between the data bit period and the PNS period enables the system to eliminate the clock frequency extractor from the receiver in FIG. 2b. In its place are switch 268 and period multiplier 272 which detect the clock, but do so at an earlier stage than in FIG. 1b because period multiplier 272 is directly connected to T&A synchronism device 264. The rest of the receiver works as before; thus, when the baseband coded data signal reaches decision circuit 260 from coherent detector 258, clock synchronization has already been performed and only frame synchronization remains to be performed.

One advantage of this system over the prior art system in FIGS. 1a and 1b is that the circuitry is simpler because the clock frequency extractor is more complex than the switches and multipliers in the transmitter and receiver that substitute for the clock frequency extractor. Another advantage is that the receiver operates more quickly because clock synchronization is performed simultaneously with carrier restoration.

However, there are still problems with this spread spectrum system. First, the bulk of the receiver still operates serially, reducing receiver throughput. Second, the frame synchronization device takes time to generate a frame synchronization signal and has low noise immunity due to the possibility of elementary signal distortion inside the frame synchronization signal, especially when communicating with moving objects. There may also be false start-ups in frame synchronization device 270 when there is low redundancy in the frame synchronization signal. Third, the operation of this type of system is limited when the PNS period is on the order of several chips, because the discrete nature of the spectrum radiated by the transmitter decreases the bandwidth of the system, lowering channel capacity when operating in code division mode and reducing noise immunity and interference rejection. These drawbacks may be lessened by lengthening the PNS period, which creates a more continuous spectrum, but that significantly complicates the receiving equipment, lengthens acquisition and tracking time, and worsens correlation functions in the receiver. This lowers the effective signal base which in turn reduces channel capacity and interference rejection.

The present invention addresses the shortcomings in these prior art systems. Thus, it is an object of the present invention to provide a spread spectrum system with better noise immunity, faster receiver synchronization, simpler electronics, and increased channel capacity and interference rejection.

SUMMARY OF THE INVENTION

The improved spread spectrum system includes a transmitter and a receiver. The transmitter includes a data channel, a control channel (also called a pilot channel), a carrier and clock frequency generator, and two PNS generators—one generating a bit PNS and the other generating a word PNS. Both PNS generators output pulses corresponding to the beginning of their respective PNS periods and provide those pulses to the data channel to time the data bits and the codewords into which the data bits are converted. The coded data signal modulates a carrier and then the modulated signal is spread by the bit PNS. The control channel controls the timing of the two PNS generators and the changing of the forms of the two PN sequences. Control data are used to modulate a quadrature-phase carrier, and this modulated quadrature-phase signal is spread by the word PNS. The spread data signal is added to the spread quadrature control signal and transmitted. The receiver includes a data channel, a control channel, and a data channel tracking and acquisition (T&A) module. The control channel includes a T&A and carrier frequency restoration module that uses a replica of the word PNS to produce the in-phase and quadrature-phase carrier, a phased version of the word PNS, and a word synchronization signal. The quadrature-phase carrier and the word PNS are respectively used to demodulate and despread the control channel portion of the received signal. The control signals are demodulated and are used to change the forms of the PN sequences in the two T&A modules. The in-phase carrier is used to demodulate the data channel portion of the received signal, and the word synchronization signal is used to acquire and track the demodulated received data signal and to provide a phased version of the bit PNS to the receiver data channel to despread the received signal. The data channel T&A module also provides a bit synchronization signal to the data channel for decision-making and decoding.

This improved spread spectrum system eliminates the need for a separate clock frequency extractor or frame synchronization device, simplifying the receiver structure and making it less expensive. The receiver operates more efficiently because the bit synchronization signal and the word synchronization signal are derived more easily and at an earlier stage than in the prior art. Faster receiver processing allows for higher bit rates. Frame synchronization is more accurate thus increasing noise immunity and the system's ability to communicate with moving objects. Changing the forms of the PN sequences makes the spectrum more continuous allowing For better noise and interference rejection and higher channel capacity.

DETAILED DESCRIPTION OF THE INVENTION

Figure 3:
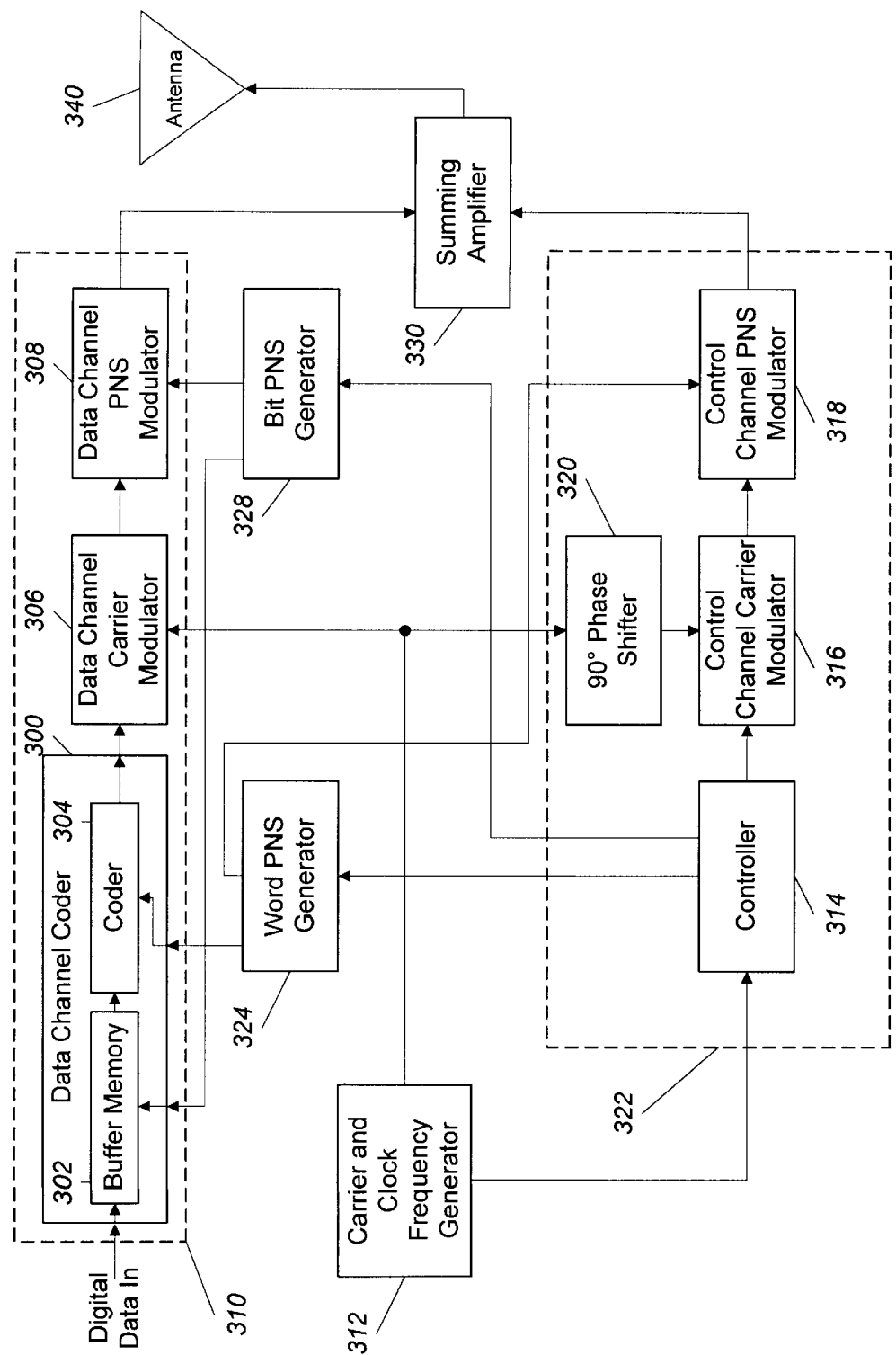
FIG. 3 is a block diagram of the transmitter of the improved spread spectrum system.

FIG. 3 is a block diagram of an improved transmitter in accordance with the present invention. It includes two transmitter channels, data channel 310 and control channel 322. In addition, there are provided carrier and clock frequency generator 312, bit PNS generator 328, word PNS generator 324, summing amplifier 330, and transmitting antenna 340. Data channel 310 includes data channel coder 300, data channel carrier modulator 306 and data channel PNS modulator 308. Control channel 322 includes phase shifter 320, controller 314, control channel carrier modulator 316, and control channel PNS modulator 318.

Figure 2A:
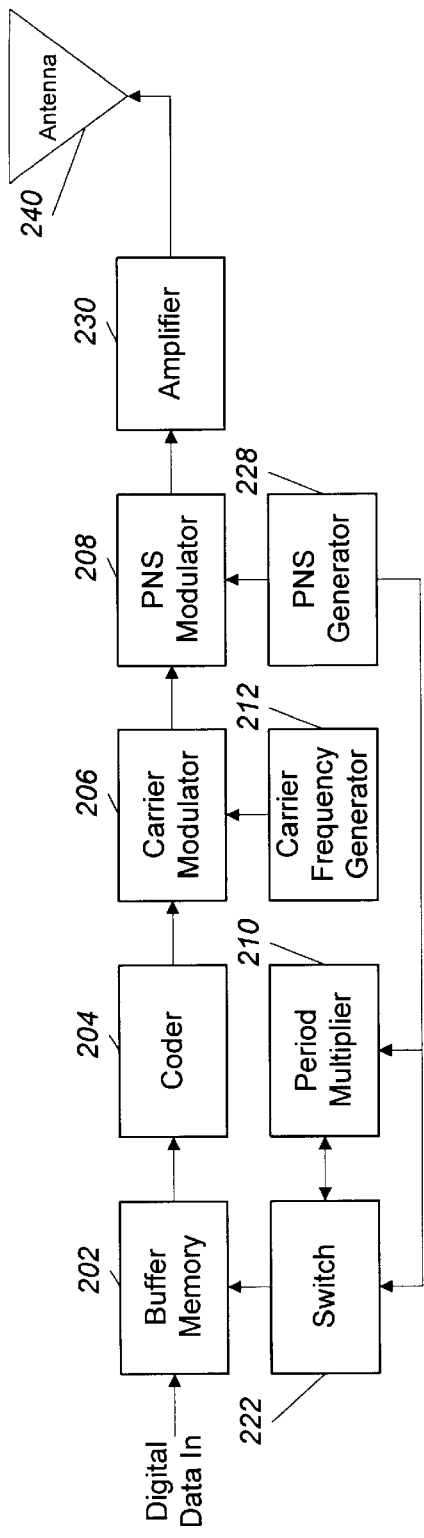
FIG. 2a is a block diagram of a second prior art spread spectrum transmitter.

As in the prior art of FIG. 2a, bit PNS generator 328 has two outputs, one output provided to data channel PNS modulator 308 generating a PN sequence with N chips per PNS period at chip rate $P_1$, the other output provided to data channel coder 300 providing a pulse at the beginning of each bit PNS period. In accordance with the invention, there is a second PNS generator, word PNS generator 324, that generates a second pseudorandom noise sequence. Word PNS generator 324 also has two outputs, one output providing M chips per PNS period at chip rate $P_2$ to control channel PNS modulator 318, and the second output providing a pulse at the beginning of each word PNS period to data channel coder 300. The two PN sequences can be generated by any known method, the most common of which uses a shift register. See, e.g., S. W. Golomb, *Shift Register Sequences* (Aegean Park Press 1982) or R. C. Dixon, *Spread Spectrum Systems with Commercial Applications* (Wiley 1994). Carrier and clock frequency generator 312 provides a carrier frequency suitable for RF transmission. It also outputs timing signals to the control channel which in turn provides the clock for word PNS generator 324 and bit PNS generator 328. Alternatively, instead of using controller 314 to clock the PNS generators, carrier and clock frequency generator 312 can directly provide separate clock outputs to the two PNS generators.

Digital data, at bit rate B, is provided to data channel coder 300. The choice of data rate B is not critical, although it is related to the bandwidth of the system by the equation $$B = \frac{k \cdot P_1}{n \cdot N}$$

where k is the number of data bits in a data word, n is the number of symbols into which the k bits are coded and transmitted, $P_1$ is the bit PNS chip rate, and N is the number of chips in each period of the bit PNS. $P_1$ is typically in the range of 0.8ΔF to 2ΔF where ΔF is the bandwidth of the system, and is more typically equal to ΔF. Although N can be any number, it is normally $2^{l-1}$ or $2^l$, where l is an integer. Typical values of N are therefore 31, 32, 63, 64, 127, 128, 255, 256, etc. Every k data bits at the input to data channel coder 300 are converted into n symbols output from data channel coder 300. The variables n and k are related by n≧k, with typical values of n in the range $$\frac{3k}{2} < n < 3k,$$

although in a non-redundant system, n=k. Thus, for $P_1$=ΔF, N=31, and n=3k $$\left(\text{or, equivalently, if } N = 63 \text{ and } n = \frac{3k}{2}\right),$$

B=0.01ΔF. In such cases, taking ΔF=1, 5, 10, 20, 250 MHz, then B=10, 50, 100, 200, 2500 kb/s, respectively. In a typical system, ΔF and B are chosen first, and N and $P_1$ are then determined based on B, n, and k. Thus, the bit PNS period, $N/P_1$, is equal to the length of each of the code symbols from data channel coder 300 which equals $$\frac{k}{n \cdot B}.$$

It is preferable to select N not less than 63 on the low side. On the high side, selection of N is limited by the acquisition time in the receiver, so it is also preferable not to select N too large.

Data channel coder 300 comprises buffer memory 302 and coder 304. Buffer memory 302, which is typically a memory register with a capacity of k bits, matches the rate of the input data to the rate of the symbols output from coder 304. Buffer memory 302 is clocked by the output pulses from bit PNS generator 328. Coder 304, which can perform either block coding or convolutional coding, is clocked by pulses from word PNS generator 324. (If convolutional coding is chosen, frame synchronization for the input data will be executed.) Thus, for the system with input data rate B, the symbol rate provided by buffer memory 302 (and coder 304) is $$B\frac{n}{k}.$$

In the specific case where n=k, coder 304 is no longer needed, but buffer memory 302 is still needed to retain the phase coincidence between the input data bits and bit PNS generator 328. The length of a codeword is equal to the word PNS period. For a word PNS period containing M chips and a word PNS chip rate of $P_2$, the word PNS period $$\frac{M}{P_2} = \frac{k}{n \cdot B} \cdot n = \frac{k}{B}$$

and therefore $$P_2 = M \cdot \frac{B}{k}.$$

If $P_1=P_2$, then M=n·N. Setting $P_1=P_2$ is preferred in order to equalize the bands in the in-phase (data) and quadrature-phase(control) channels. However, $P_1$ can also be greater or less than $P_2$. If $P_1>P_2$, then n·N>M; if $P_1<P_2$, then n·N 21 M. It is even possible that M=N, i.e. the lengths of the bit PNS and the word PNS are the same.

After coding, the symbol stream is provided to data channel modulator 306 to modulate the carrier signal. The modulator can use any type of modulation, however binary phase shift keying (BPSK) or differential phase shift keying (DPSK) are preferable. The modulated output is provided to data channel PNS modulator 308 where it is spread by the bit PNS.

Figure 4:
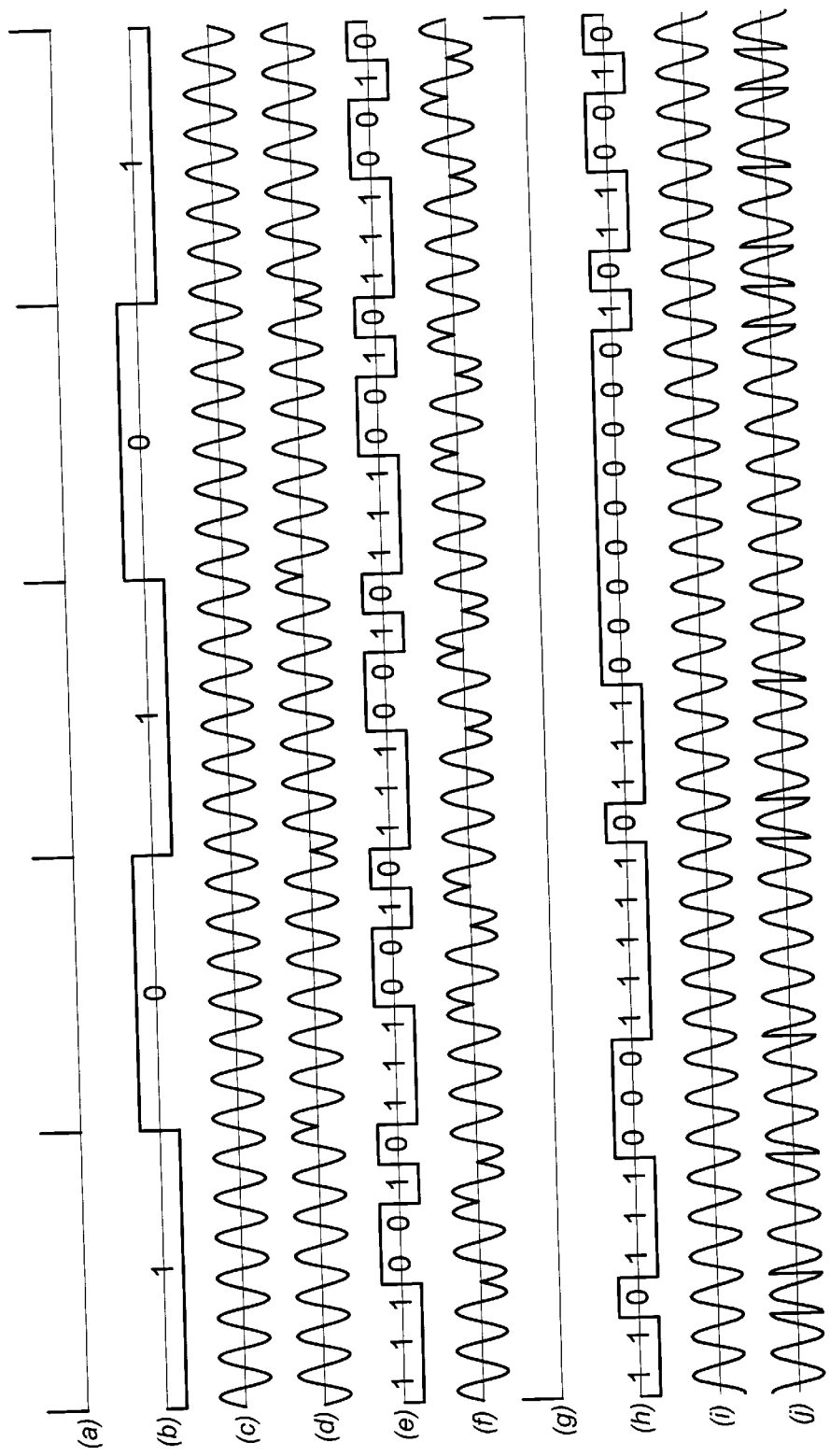
FIG. 4 is a timing diagram of the signals within the transmitter.

Exemplary waveforms at various points in the transmitter are shown in FIG. 4. That figure depicts the case where there are five bits per data word with no redundant coding (n=k=5) (i.e. International Telegraphy Code ITC-2), N=7, and $P_1=P_2$ so that M=n·N=35. Waveform 4(a) shows the pulse output of bit PNS generator 328 that clocks buffer memory 302. Waveform 4(b) shows the data signal 10101 at the input to data channel modulator 306. Waveform 4(c) shows the carrier signal at the input to data channel modulator 306. Waveform 4(d) shows the modulated output from data channel modulator 306. Waveform 4(e) shows the output of bit PNS generator 328 as a 7-bit Barker code, 1110010, repeated each period. Waveform 4(f) shows waveform 4(d) modulated by the bit PNS. Waveform 4(f) is the data channel signal and is provided to summing amplifier 330 to be added to the control channel signal.

Control channel 322 operates in a manner similar to that of the data channel except that its bit rate is lower than that of the data rate and the channel is modulated with the quadrature-phase carrier. More specifically, carrier and clock frequency generator 312 provides clock rate $B_c$ to controller 314. This clock rate is related to the chip rate $P_2$ by the same relation as in data channel 310, i.e., $$P_2 = M \cdot \frac{B}{k}.$$

In control channel 322, $B_c$=B/k (i.e. $B_c$<B), thus $P_2=M \cdot B_c$. Controller 314 synchronizes bit PNS generator 328 and word PNS generator 324 with a pulse rate equal to $B_c$ (=B/k). Also, controller 314 sends instructions to the two PNS generators and changes the forms of the two PN sequences by dictating different sequences. For example, if the bit PNS is 1110010 (as in FIG. 4(e)), controller 314 might change it to its inverse 0100111 (see FIG. 5(e)). Similarly, if the word PNS is 1101110 0011111 0111000 00000001 0110010 (see FIG. 4(h)), controller 314 might change it to its inverse 0100110 1000000 0001110 1111100 0111011 (see FIG. 5(h)). There are many possible forms that the two PN sequences may take on, and they are prepro-grammed by the system designer. However, only the sequences themselves change—the chip rate, the sequence length, and the phase relationship between the two PNS generators do not change.

This change of PNS forms makes the PN sequences more random and thus increases interference rejection and channel capacity. Without changing forms, the spectrum of the bit PNS becomes discrete because of periodic repetition of the same PNS. This decreases the processing gain of the system (see e.g., R. C. Dixon, *Spread Spectrum Systems with Commercial Applications* (FIGS. 2.7,3.2) (Wiley 1984)). If the PNS forms change at the frequency of the codeword repetitionrate, B/k, a specific bit PNS will only be transmitted n times during the codeword and then the PNS will change. Thus the signal spectrum will begin to look continuous, and processing gain will increase because it is directly proportional to the bandwidth the system. The specific amount of the increase in processing gain is determined experimentally, not analytically.

Because the PNS forms must also change in the receiver, the control channel instructions are provided to control channel carrier modulator 316. The instruction bits modulate the carrier signal from carrier and clock frequency generator 312, the output of which has been phase shifted 90° in phase shifter 320. Although phase shifter 320 is depicted in FIG. 3 as being part of control channel 322, it could just as easily be a separate module or could be part of carrier and clock frequency generator 312. The resulting quadrature-phase modulated carrier is further modulated by the word PNS in control channel PNS modulator 318 and the resulting signal is provided to summing amplifier 330 to be combined with the data channel modulated signal and then transmitted via antenna 340.

Exemplary control channel waveforms are shown in FIG. 4. Waveform 4(g) shows the output pulses of word PNS generator 324. Because the clock rate controlling controller 314 is the same as the output pulse rate of word PNS generator 324, the controller output bits are not shown. Waveform 4(h) shows the word PNS having 35 chips per clock period, corresponding to the pulses of word PNS generator 324, as described above. Waveform 4(i) shows the carrier signal at the input to control channel modulator 316 (it is phase shifted 90° from waveform 4(c)). Waveform 4(j) shows the modulated output from control channel carrier modulator 316 and is the control channel signal provided to summing amplifier 330 to be added to the data channel signal.

Figure 5:
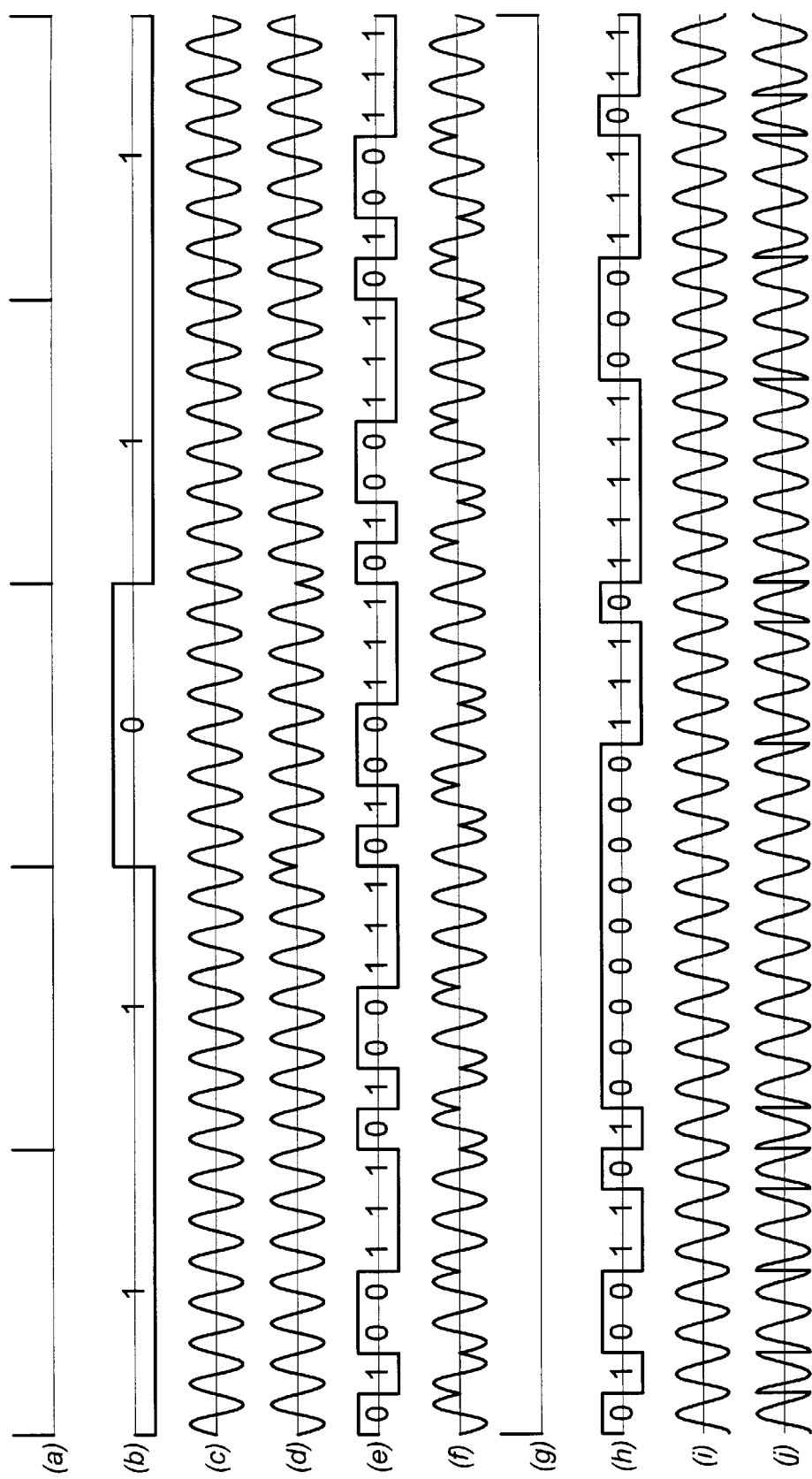
FIG. 5 is a second timing diagram of the signals within the transmitter after the PNS forms have been changed.

FIG. 5 depicts the waveforms at the same points as in FIG. 4, but the PNS forms have been changed. Waveforms 5(a), 5(c), 5(g), and 5(i) are the same as waveforms 4(a), 4(c), 4(g), and 4(i), respectively. Waveform 5(b), the input data signal, is now 11011, thus changing waveform 5(d), the output signal from data channel carrier modulator 306. Waveform 5(e) is the inverse PNS of waveform 4(e), and waveform 5(f) shows the resulting data channel output signal. Waveform 5(h) shows the changed form of the word PNS as described earlier, and waveform 5(j) shows the control channel output signal.

Figure 6:
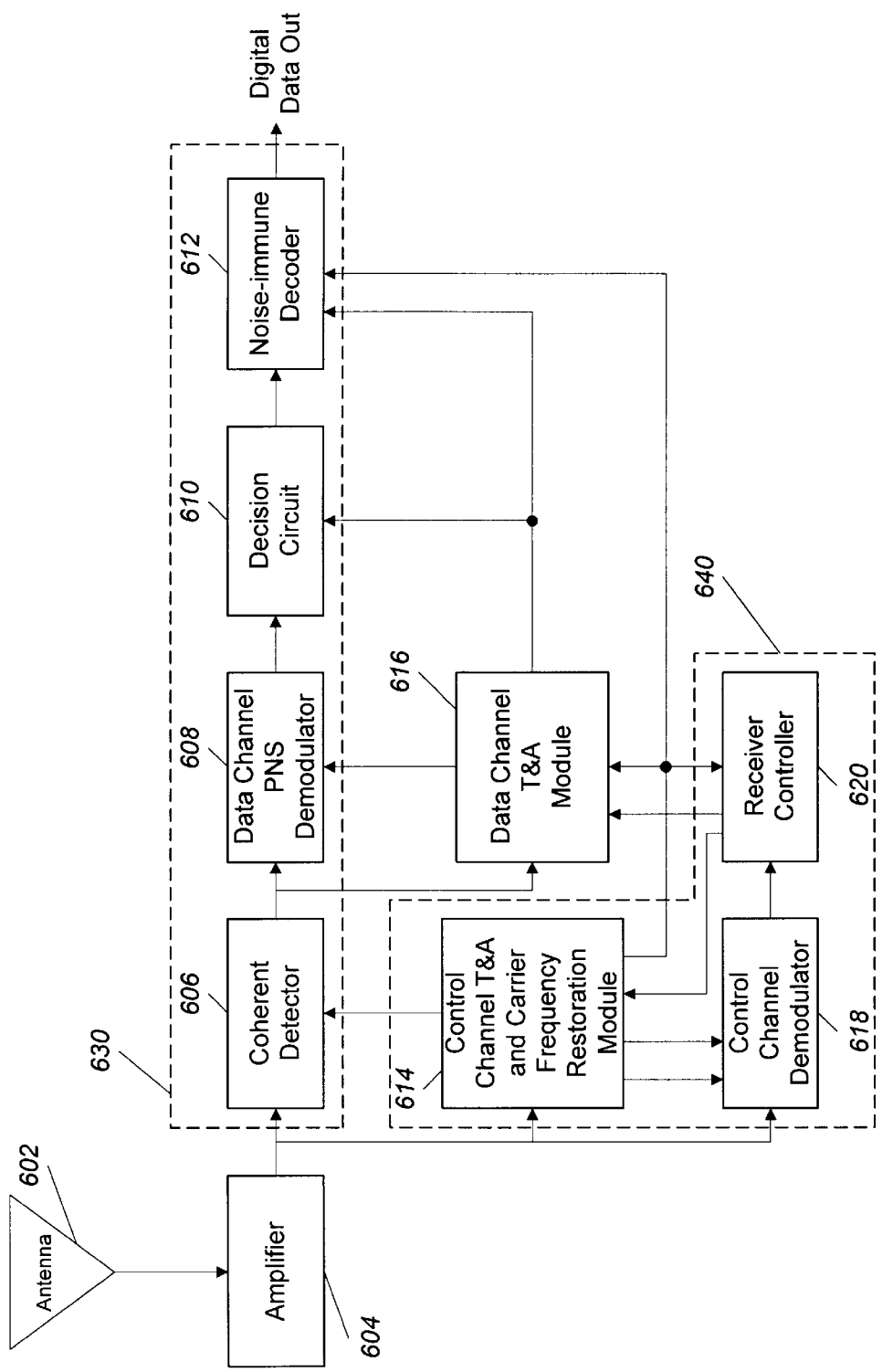
FIG. 6 is a block diagram of the receiver of the improved spread spectrum system.

FIG. 6 is a block diagram of the receiver of the improved spread spectrum system. As in the transmitter,the receiver comprises two channels, data channel 630 and control channel 640. In addition, there is also data channel tracking and acquisition (T&A) module 616, amplifier 604, and receiving antenna 602. Data channel 630 includes coherent detector 606, data channel PNS demodulator 608, decision circuit 610, and noise-immune decoder 612. Control channel 640 further comprises control channel T&A and carrier frequency restoration module 614, control channel demodulator 618, and receiver controller 620.

Figure 1A:
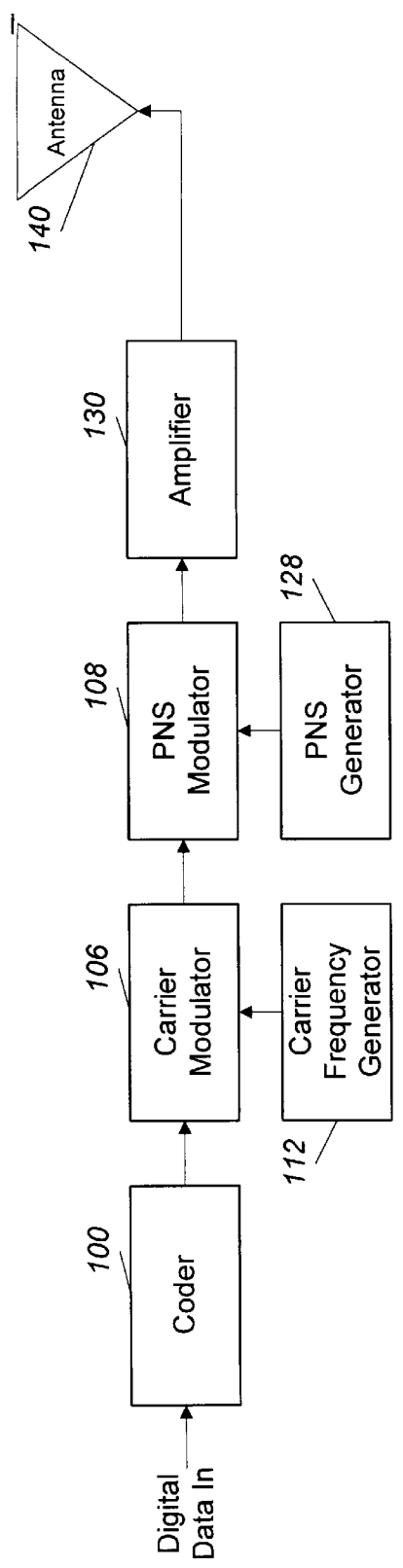
FIG. 1a is a block diagram of a prior art spread spectrum transmitter.
Figure 1B:
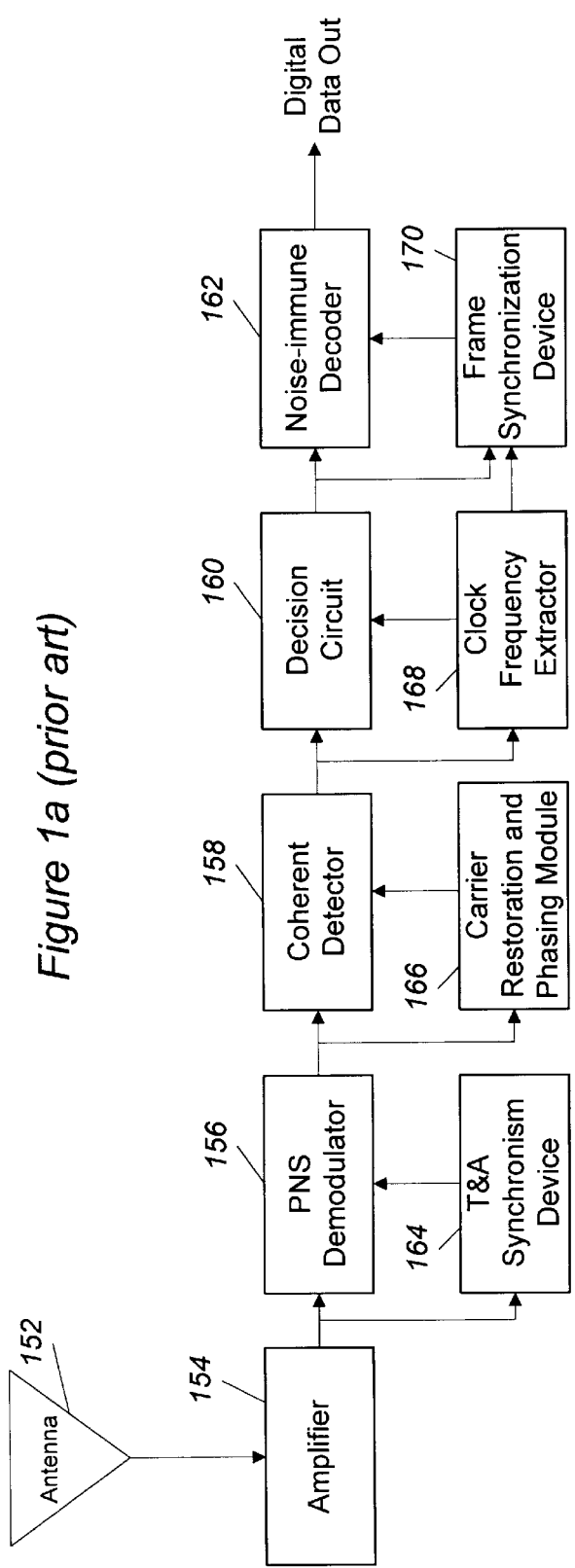
FIG. 1b is a block diagram of a prior art spread spectrum receiver.
Figure 2B:
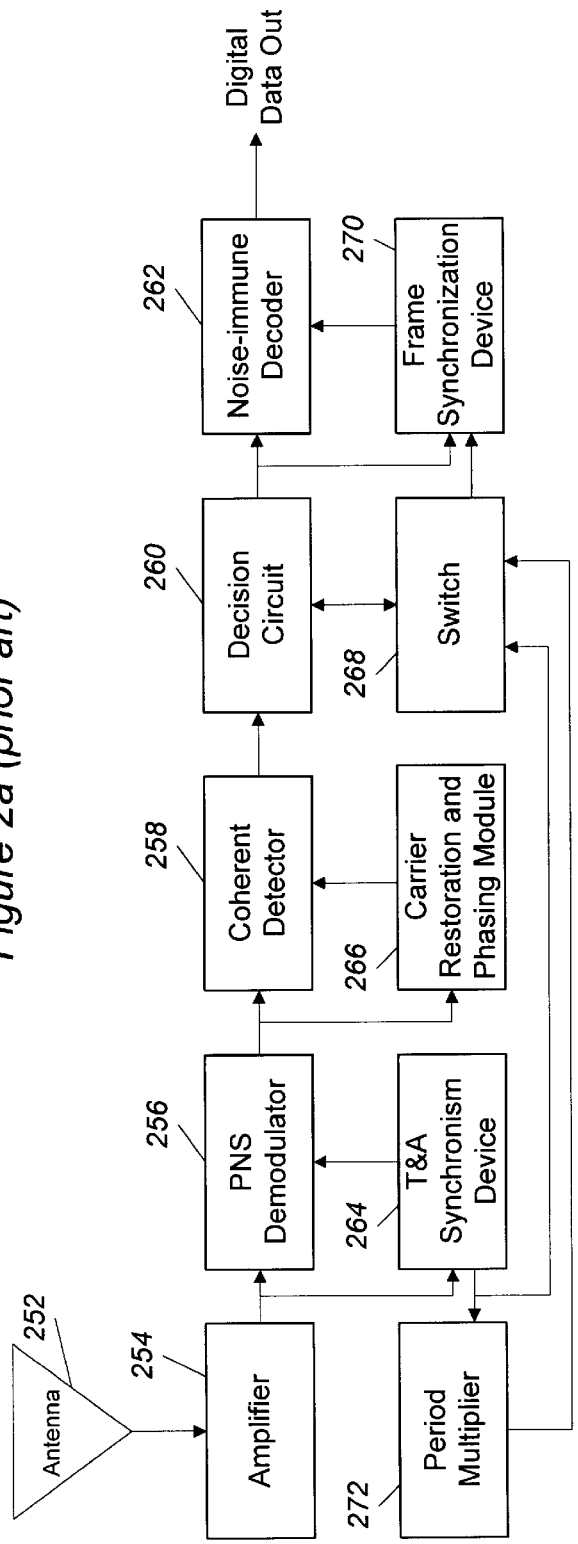
FIG. 2b is a block diagram of a second prior art spread spectrum receiver.

Receiving antenna 602 and amplifier 604 operate as in the prior art systems of FIGS. 1b and 2b. The received signal is first provided to control channel T&A and carrier frequency restoration module 614. As in the prior art, the acquisition circuitry of this module includes a PNS generator that produces the same PNS as in the transmitter. In the present invention, only the word PNS is used in the acquisition circuitry in control channel T&A module 614. (The bit PNS is used in data channel T&A module 616.) Besides this feature, acquisition is accomplished as in prior art systems. Once the received signal is acquired, tracking proceeds as in the prior art, generally using a delay-lock loop. In addition, carrier restoration is also performed by control channel T&A module 614, just as in the prior art, typically using a phase-locked loop. See, e.g., A. J. Viterbi, *CDMA: Principles of Spread Spectrum Communication* (Addison-Wesley 1995). These processes yield four outputs—a correctly phased version of the word PNS, a quadrature-phase version of the carrier signal, an in-phase version of the carrier signal (formed by shifting the quadrature-phase version 90°), and a word synchronization signal derived from the timing of the word PNS. In the specific case of M=n·N, then the word synchronization signal and the phased version of the word PNS have the same period. The phased PNS and the quadrature-phase carrier signal are provided to control channel demodulator 618 to despread the word PNS from the received signal. The signal provided to controller 620 from control channel demodulator 618 consists of the control signals needed to change the PNS forms in the receiver. Using the word synchronization signal from control channel T&A module 614, controller 620 provides control instructions to control channel T&A module 614 and to data channel T&A module 616.

Simultaneously, the in-phase version of the carrier signal is provided from control channel T&A module 614 to coherent detector 606 to demodulate the received signal. Data channel T&A module 616 then uses the control channel instructions from controller 620 and the word synchronization signal from control channel T&A module 614 to acquire and track the demodulated signal from coherent detector 606. Within data channel T&A module 616 is a stored version of the bit PNS and tracking and acquisition of this PNS are performed in the conventional manner. Data channel T&A module 616 provides a phased version of the bit PNS to data channel PNS demodulator 608 which despreads the demodulated signal and produces a coded data signal. Data channel T&A module 616 also provides the bit synchronization signal to decision circuit 610 and to noise-immune decoder 612. Decision circuit 610 operates as in the prior art and provides squared-up digital data code bits to noise-immune decoder 612. Noise-immune decoder 612 then uses both the bit synchronization signal and the word synchronization signal to decode the coded bits into the output digital signal.

This spread spectrum system has several advantages over the prior art. First, by using the bit and word PN sequences and the output pulse sequences from the two PNS generators in the transmitter, the receiver is able to derive the bit synchronization and word synchronization signals without using a clock frequency extractor or a frame synchronization device as in the prior art. This simplifies the electronics and makes the system less expensive. Second, because the bit and word synchronization signals are derived earlier in the receiving process, the regeneration of the transmitted data signal is performed more quickly. This allows for higher throughput and therefore higher bit rates. Third, the controllers in the transmitter and the receiver control and change the PNS forms of the two PN sequences, broadening the bandwidth of the system and increasing the processing gain.

This also increases noise immunity, interference rejection, and channel capacity.

While several embodiments have been illustrated and described, other variations and alternate embodiments will occur to those skilled in the art. These variations and embodiments remain within the spirit and scope of this invention.

We claim:

1. A system for transmitting and receiving a spread spectrum data signal at a predefined nominal data rate comprising:

a transmitter including:
  a means for generating clock signals and carrier signals having in-phase and quadrature components;
  a first pseudorandom noise sequence generator generating a first pseudorandom noise sequence and a first set of output pulses, said first pseudorandom noise sequence being periodic and each output pulse corresponding to the beginning of each period of said first pseudorandom noise sequence;
  a second pseudorandom noise sequence generator generating a second pseudorandom noise sequence and a second set of output pulses, said second pseudorandom noise sequence being periodic and each output pulse corresponding to the beginning of each period of said second pseudorandom noise sequence;
  a transmitter data signal channel that encodes said data signal using said first set of output pulses and said second set of output pulses, modulates said in-phase carrier signal with said encoded data signal, and further modulates said modulated in-phase carrier signal with said first pseudorandom noise sequence to generate a transmittable data signal;
  a transmitter control signal channel that provides control and clock signals to said first pseudorandom noise sequence generator and to said second pseudorandom noise sequence generator that change the forms of said first and second pseudorandom noise sequences, and modulates said quadrature-phase carrier signal with said control signals, and further modulates said modulated quadrature-phase carrier signal with said second pseudorandom noise sequence to generate a transmittable control signal; and
  an adder for combining said transmittable data signal and said transmittable control signal to provide an output communication signal; and a receiver including:
  a receiver control signal channel for acquiring and tracking said communication signal, thereby to provide local oscillator signals corresponding to said carrier signal and a word synchronization signal;
  a data signal demodulator responsive to said communication signal and said local oscillator signals for providing a demodulated data channel signal;
  a data channel tracking and acquisition module responsive to said demodulated data channel signal and said word synchronization signal for deriving a bit synchronization signal and a synchronized replica of said first pseudorandom noise sequence; and
  a data channel demodulator responsive to said replica of said first pseudorandom noise sequence and to said bit synchronization signal for deriving received data signals.

2. A system as in claim 1 wherein said transmitter data signal channel comprises:
  a data channel coder that codes the data signal into noise-immune code comprised of symbols at a symbol rate corresponding to the repetition rate of said second pseudorandom noise sequence;
  a data channel carrier modulator that modulates said in-phase carrier signal with said noise-immune coded data signal; and
  a data channel pseudorandom noise sequence modulator that modulates said modulated in-phase carrier signal from said data channel carrier modulator with said first pseudorandom noise sequence.

3. A system as in claim 2 wherein said data channel coder comprises a buffer memory and a coder,
  wherein said buffer memory is adapted for matching the nominal data rate with the rate that the symbols are output from the coder, and
  wherein the coder codes the data signal into noise-immune code with a frequency according to the period of said second pseudorandom noise sequence.

4. A system as in claim 1 wherein said transmitter control signal channel comprises:
  a transmitter controller for producing control and timing signals;
  a control channel carrier modulator that modulates said quadrature-phase carrier signal with said control signals; and
  a control channel pseudorandom noise sequence modulator that modulates said modulated quadrature-phase carrier signal from said control channel carrier modulator with said second pseudorandom noise sequence.

5. A system as in claim 1 wherein said receiver control signal channel comprises:
  a control channel tracking and acquisition and carrier frequency restoration module that acquires the communication signal, tracks it, extracts said in-phase and quadrature-phase carrier signals, and outputs the in-phase carrier signal, the quadrature-phase carrier signal, the second pseudorandom noise sequence, and said word synchronization signal which comprises a set of pulses, each pulse corresponding to the beginning of a period of said second pseudorandom noise sequence;
  a control channel demodulator responsive to the quadrature-phase carrier signal and a synchronized replica of said second pseudorandom noise sequence for demodulating the control signals from the communication signal to derive unmodulated control signals; and
  a receiver controller responsive to the control signals from the control channel demodulator and said word synchronization signal for controlling the data channel tracking and acquisition module.

6. A system as in claim 1 wherein said data signal demodulator comprises:
  a data channel pseudorandom noise sequence demodulator responsive to said synchronized replica of said first pseudorandom noise sequence for further demodulating the modulated communication signal to produce a series of unmodulated data bits;
  a decision circuit that is clocked by the bit synchronization signal and that decides whether the unmodulated data bits are low or high; and
  a noise-immune decoder responsive to said bit synchronization signal and said word synchronization signal for decoding the data bits and deriving an output data signal.

7. A system for transmitting and receiving a spread spectrum data signal at a predefined nominal data rate comprising:

a transmitter including:
  a means for generating clock signals and carrier signals having in-phase and quadrature components;
  a means for generating a first pseudorandom noise sequence and a first set of output pulses, said first pseudorandom noise sequence being periodic and each output pulse corresponding to the beginning of each period of said first pseudorandom noise sequence;
  a means for generating a second pseudorandom noise sequence and a second set of output pulses, said second pseudorandom noise sequence being periodic and each output pulse corresponding to the beginning of each period of said second pseudorandom noise sequence;
  a data signal channel comprising:
    a data channel coder that codes the data signal into noise-immune code comprised of symbols at a symbol rate corresponding to the repetition rate of said second pseudorandom noise sequence;
    a data channel carrier modulator that modulates said in-phase carrier signal with said noise-immune coded data signal; and
    a data channel pseudorandom noise sequence modulator that modulates said modulated in-phase carrier signal from said data channel carrier modulator with said first periodic pseudorandom noise sequence;
  and a control signal channel comprising:
    a transmitter controller for producing control and timing signals and for changing the forms of the first and second pseudorandom noise sequences;
    a control channel carrier modulator that modulates said quadrature-phase carrier signal with said control signals; and
    a control channel pseudorandom noise sequence modulator that modulates said modulated quadrature-phase carrier signal from said control channel carrier modulator with said second pseudorandom noise sequence; and
  an adder for combining the output of said data signal channel to the output of said control signal channel to provide an output communication signal;
and a receiver including:
  a control channel tracking and acquisition and carrier frequency restoration module that acquires the communication signal, tracks it, extracts the carrier signal, and outputs the in-phase carrier signal, the quadrature-phase carrier signal, the second pseudorandom noise sequence, and a word synchronization signal comprising a set of pulses, each pulse corresponding to the beginning of a period of said second pseudorandom noise sequence;
  a control channel demodulator responsive to the quadrature-phase carrier signal and a synchronized replica of said second pseudorandom noise sequence for demodulating the control signals from the communication signal to derive unmodulated control signals;
  a receiver controller responsive to the control signals from the control channel demodulator and said word synchronization signal for controlling the control channel tracking and acquisition and carrier frequency restoration module to change the forms of the first and second pseudorandom noise sequences;
  a coherent detector responsive to said in-phase carrier signal for demodulating the communication signal;
  a data channel tracking and acquisition module controlled by the receiver controller and responsive to the word synchronization signal for acquiring and tracking the demodulated communication signal to derive a bit synchronization signal and a synchronized replica of said first pseudorandom noise sequence;
  a data channel pseudorandom noise sequence demodulator responsive to said synchronized replica of said first pseudorandom noise sequence for demodulating the modulated communication signal to derive a series of unmodulated data bits;
  a decision circuit that is clocked by the bit synchronization signal and that decides whether the unmodulated data bits are low or high; and
  a noise-immune decoder responsive to said bit synchronization signal and said word synchronization signal for decoding the data bits and deriving an output data signal.

8. The system of claim 7 wherein said data channel coder comprises a buffer memory and a coder, said buffer memory matching the data rate of the data signals to the rate that the symbols are output from the coder.

9. The system of claim 7 wherein the data rate of the data signals is equal to the rate that the symbols are output from the data channel coder.

10. The system of claim 7 wherein said data channel coder convolutionally encodes the data signal.

11. The system of claim 7 wherein said data channel coder block encodes the data signal.

12. The system of claim 7 wherein said first pseudorandom noise sequence has a clock rate equal to a clock rate of said second pseudorandom noise sequence.

13. The system of claim 7 wherein one period of said first pseudorandom noise sequence has the same number of chips as does one period of said second pseudorandom noise sequence.

14. The system of claim 7 wherein the control channel tracking and acquisition and carrier frequency restoration module comprises a pseudorandom noise sequence generator that generates said second pseudorandom noise sequence.

15. The system of claim 7 wherein the data channel tracking and acquisition module comprises a pseudorandom noise sequence generator that generates said first pseudorandom noise sequence.

16. A system for transmitting and receiving a spread spectrum data signal at a predefined nominal data rate comprising:
  a transmitter having a carrier frequency signal generator to generate a carrier frequency signal, a data channel coder that codes the data signal, a data channel carrier modulator that modulates the carrier frequency signal with the coded data signal, a pseudorandom noise sequence generator, and a data channel pseudorandom noise sequence modulator that further modulates the modulated carrier frequency signal with a pseudorandom noise sequence; and
  a receiver having a tracking and acquisition synchronization module that acquires and tracks a communication signal, a demodulator that demodulates the pseudorandom noise sequence from the communication signal, a coherent detector responsive to a restored carrier frequency signal for demodulating the modulated communication signal, a decision circuit responsive to a bit synchronization signal for determining whether the demodulated communication signal contains low or high bits, a noise-immune decoder responsive to a word synchronization signal and said bit synchronization signal for decoding the demodulated communication signal and deriving an output data signal, the improvement wherein the transmitter further comprises a second pseudorandom noise sequence generator and a transmitter control channel that changes the forms of the pseudorandom noise sequence and the second pseudorandom noise sequence, and the receiver further comprises a receiver control channel that includes a control channel tracking and acquisition and carrier restoration module, said receiver control channel changing the forms of the pseudorandom noise sequence and the second pseudorandom noise sequence and controlling the tracking and acquisition synchronization module in order to extract the bit synchronization signal and the word synchronization signal without the need of a separate clock frequency extractor and frame synchronization device.

* * * * *

UNITED STATES PATENT AND TRADEMARK OFFICE
CERTIFICATE OF CORRECTION

PATENT NO. : 5,995,536
DATED : November 30, 1999
INVENTOR(S) : Arkhipkin et al.

Page 1 of 1

It is certified that error appears in the above-identified patent and that said Letters Patent is hereby corrected as shown below:

Title Page of Patent,
Item [73] Assignee, "Russian Federation" should read -- Netherlands Antilles --.

Column 6,
Line 14, "$n \cdot 21M$" should read -- $n \cdot N < M$ --.

Column 7,
Line 9, "repititionrate" should read -- repitition rate --;
Line 56, "transmitter,the" should read -- transmitter, the --.

Signed and Sealed this

Twenty-fourth Day of July, 2001

Attest:

NICHOLAS P. GODICI
Attesting Officer
Acting Director of the United States Patent and Trademark Office